United States Patent
Takahashi

(10) Patent No.: US 10,422,952 B2
(45) Date of Patent: Sep. 24, 2019

(54) OPTICAL WAVEGUIDE DEVICE AND METHOD FOR MANUFACTURING AN OPTICAL WAVEGUIDE DEVICE

(71) Applicant: NEC CORPORATION, Tokyo (JP)

(72) Inventor: Morio Takahashi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/865,897

(22) Filed: Jan. 9, 2018

(65) Prior Publication Data

US 2018/0128976 A1    May 10, 2018

Related U.S. Application Data

(62) Division of application No. 14/868,925, filed on Sep. 29, 2015, now Pat. No. 9,897,755.

(30) Foreign Application Priority Data

Oct. 22, 2014 (JP) .................. 2014-215056

(51) Int. Cl.
  *G02B 6/12* (2006.01)
  *G02B 6/125* (2006.01)
  *G02B 6/28* (2006.01)

(52) U.S. Cl.
  CPC ............ *G02B 6/125* (2013.01); *G02B 6/2813* (2013.01); *G02B 2006/12061* (2013.01)

(58) Field of Classification Search
  CPC .................. G02B 6/125; G02B 6/2813; G02B 2006/12061
  See application file for complete search history.

(56) References Cited

U.S. PATENT DOCUMENTS

| 4,787,693 A | 11/1988 | Kogelnik et al. |
| 5,488,680 A | 1/1996 | Dragone |

(Continued)

FOREIGN PATENT DOCUMENTS

| JP | 2000-091319 A | 3/2000 |
| JP | 2001-339067 A | 12/2001 |

(Continued)

OTHER PUBLICATIONS

Corley, Anne-Marie, New Chips Loaded With Dummy Parts, IEEE Spectrum, https://spectrum.ieee.org/semiconductors/design/new-chips-loaded-with-dummy-parts, Sep. 16, 2009. (Year: 2009).*

(Continued)

*Primary Examiner* — Peter Radkowski
(74) *Attorney, Agent, or Firm* — Sughrue Mion, PLLC

(57) ABSTRACT

An optical waveguide device includes first and second branching devices and first to fourth distribution optical waveguides that are formed on an optical waveguide substrate including a latticed dummy pattern of a predetermined pitch and that are arranged, in a region where the dummy pattern is removed, so as to be separated from the dummy pattern, and an interval between the first and second distribution optical waveguides at an output point of the first branching device is equal to an interval between the third and fourth distribution optical waveguides at an output point of the second branching device, and a distance between light propagation centers of the first and second branching devices is an integer multiple of the pitch, and at a point where a distance between neighboring distribution optical waveguides becomes maximum, the distance between the neighboring distribution optical waveguides is an integer multiple of the pitch.

8 Claims, 5 Drawing Sheets

(56) References Cited

U.S. PATENT DOCUMENTS

| | | | |
|---|---|---|---|
| 5,773,844 A | 6/1998 | Kawamura et al. | |
| 5,841,919 A | 11/1998 | Akiba et al. | |
| 5,940,555 A | 8/1999 | Inaba et al. | |
| 6,037,195 A | 3/2000 | Toriyama et al. | |
| 6,096,585 A | 8/2000 | Fukuda et al. | |
| 6,360,047 B1 | 3/2002 | Nekado et al. | |
| 6,374,013 B1 | 4/2002 | Whiteaway et al. | |
| 7,190,050 B2* | 3/2007 | King | H01L 21/84 257/401 |
| 7,247,887 B2* | 7/2007 | King | H01L 27/0207 257/139 |
| 7,265,008 B2* | 9/2007 | King | H01L 21/845 257/E21.618 |
| 7,508,031 B2* | 3/2009 | Liu | H01L 27/0207 257/288 |
| 7,528,465 B2* | 5/2009 | King | H01L 21/84 257/401 |
| 7,605,449 B2* | 10/2009 | Liu | H01L 29/785 257/401 |
| 7,807,523 B2* | 10/2010 | Liu | H01L 29/785 438/187 |
| 7,960,232 B2* | 6/2011 | King | H01L 21/84 257/E21.442 |
| 8,466,490 B2* | 6/2013 | Liu | H01L 29/785 257/139 |
| 8,786,057 B2* | 7/2014 | King | H01L 21/84 257/622 |
| 9,122,003 B2 | 9/2015 | Onishi | |
| 9,164,237 B2 | 10/2015 | Onishi | |
| 2002/0015554 A1 | 2/2002 | Oguma et al. | |
| 2002/0048443 A1 | 4/2002 | Itoh et al. | |
| 2002/0097962 A1 | 7/2002 | Yoshimura et al. | |
| 2002/0181916 A1 | 12/2002 | Won et al. | |
| 2007/0001232 A1* | 1/2007 | King | H01L 21/84 257/368 |
| 2007/0001237 A1* | 1/2007 | King | H01L 27/0207 257/401 |
| 2007/0004113 A1* | 1/2007 | King | H01L 21/845 438/197 |
| 2007/0086711 A1* | 4/2007 | Terada | G02B 6/125 385/95 |
| 2007/0120156 A1* | 5/2007 | Liu | H01L 27/0207 257/288 |
| 2007/0122953 A1* | 5/2007 | Liu | H01L 27/0207 438/187 |
| 2007/0122954 A1* | 5/2007 | Liu | H01L 27/0207 438/187 |
| 2007/0128782 A1* | 6/2007 | Liu | H01L 27/0207 438/187 |
| 2007/0132053 A1* | 6/2007 | King | H01L 21/84 257/499 |
| 2008/0290470 A1* | 11/2008 | King | H01L 21/84 257/622 |
| 2009/0181477 A1* | 7/2009 | King | H01L 21/84 438/17 |
| 2013/0330038 A1 | 12/2013 | Onishi | |
| 2014/0023314 A1 | 1/2014 | Onishi | |
| 2014/0284727 A1* | 9/2014 | King Liu | H01L 21/84 257/401 |
| 2015/0010263 A1 | 1/2015 | Fong et al. | |
| 2016/0359006 A1* | 12/2016 | King Liu | H01L 21/84 |

FOREIGN PATENT DOCUMENTS

| | | | |
|---|---|---|---|
| JP | 2002289971 A | 10/2002 | |
| JP | 2005142182 A | 6/2005 | |
| JP | 2013-254163 A | 12/2013 | |
| JP | 2014-092758 A | 5/2014 | |
| WO | 2012/086846 A1 | 6/2012 | |
| WO | WO-2012086846 A1 * | 6/2012 | G02B 6/125 |

OTHER PUBLICATIONS

Communication dated Apr. 17, 2018, from the Japanese Patent Office in counterpart application No. 2014-215056.

Guha et al., "Minimizing temperature sensitivity of silicon Mach-Zehnder interferometers", Opt. Express 18, 1879-1887 (2010).

Charles, et al., "Design of optically path-length-matched, three-dimensional photonic circuits comprising uniquely routed waveguides", Appl. Opt. 51,6489-6497 (2012).

Charles, et al., Techniques for Designing Physically Path-Length Matched Optical Circuitry, IQEC/CLEO Pacific Rim 2011, pp. 73-75.

* cited by examiner

OPTICAL WAVEGUIDE DEVICE AND METHOD FOR MANUFACTURING AN OPTICAL WAVEGUIDE DEVICE

CROSS REFERENCE TO RELATED APPLICATIONS

This application is a divisional of U.S. patent application Ser. No. 14/868,925, filed Sep. 29, 2015, which claims priority to Japanese Patent Application No. 2014-215056, filed Oct. 22, 2014, the contents of all of which are incorporated herein by reference.

TECHNICAL FIELD

The present invention relates to an optical waveguide device, and a method for manufacturing the same.

BACKGROUND ART

Increase in capacity of an optical fiber transmission system has been largely advanced by speeding up intensity modulation and increasing the number of multiplexed wavelengths. Recently, advancement in a digital signal processing technique has enabled transmission capacity to be further increased by using an existing optical fiber network, with a polarized light multiplexing technique and a multi-level phase modulation technique.

An optical fiber transmission system in which the multi-level phase modulation technique is adopted needs, in a receiver, a device called a hybrid mixer that converts a phase-modulated optical signal into an intensity-modulated optical signal. The hybrid mixer causes signal light propagated through an optical fiber to interfere with unmodulated local oscillation light (LO) having fixed amplitude and phase. The hybrid mixer causes the signal light to interfere with the LO to thereby convert phase change of the phase-modulated signal light into an intensity-modulated signal light.

The hybrid mixer is an optical circuit device that causes two light beams LO having phases different from each other by 90 degrees to interfere with two signal light beams having the same phase, respectively. To implement the hybrid mixer, an optical waveguide device having a superior optical characteristics is widely used. The hybrid mixer includes two optical waveguides (distribution optical waveguides) for each of distribution of the signal light beams and distribution of the light beams LO. The configuration of such a hybrid mixer is disclosed in the patent literature 1 (International Publication No. WO2012/086846).

There is a strong demand for smaller and lower-cost hybrid mixers, to implement a high-performance system with lower cost. For this reason, technical development has been made to implement, using complementary metal-oxide semiconductor (CMOS) process technology, a silicon optical waveguide which enables drastic downsizing compared with a glass optical waveguide widely used so far. The CMOS process technology is widely used in large scale integration (LSI) manufacturing.

Further, in relation to the present invention, the patent literature 2 (Japanese Patent Application Laid-Open Publication No. 2000-091319) describes a technique for forming a dummy pattern to achieve uniform etching on an entire wafer surface.

SUMMARY

An exemplary object of the invention is to provide a technique for making it possible to manufacture an optical waveguide device superior in reproducibility and mass productivity.

An optical waveguide device according to an exemplary aspect of the invention includes:

a first branching device branching input first light into two light beams, first and second distribution optical waveguides being connected to the first branching device, the first distribution optical waveguide outputting as second light one of the two light beams, the second distribution optical waveguide outputting as third light the other of the two light beams;

a second branching device branching input fourth light into two light beams, third and fourth distribution optical waveguides being connected to the second branching device, the third distribution optical waveguide outputting as fifth light one of the two light beams of the fourth light, the fourth distribution optical waveguide outputting as sixth light the other of the two light beams of the fourth light;

a first interfering device making the second light interfere with the fifth light to thereby generate and output light, the first distribution optical waveguide and the third distribution optical waveguide being connected to the first interfering device; and a second interfering device making the third light interfere with the sixth light to thereby generate and output light, the second distribution optical waveguide and the fourth distribution optical waveguide being connected to the second interfering device, wherein the first and second branching devices and the first and second interfering devices are formed on an optical waveguide substrate that comprises a latticed dummy pattern having a predetermined pitch, the second distribution optical waveguide intersects with the third distribution optical waveguide at an intersection portion, the first and second branching devices, the first to fourth distribution optical waveguides, the first and second interfering devices, and the intersection portion are arranged, in a region where the dummy pattern is removed, so as to be separated from the dummy pattern, an interval between the first distribution optical waveguide and the second distribution optical waveguide at an output point of the first branching device are equal to an interval between the third distribution optical waveguide and the fourth distribution optical waveguide at an output point of the second branching device, a distance between a light propagation center of the first branching device and a light propagation center of the second branching device is an integer multiple of the pitch, at a point where a distance between neighboring distribution optical waveguides of the first to fourth distribution optical waveguides becomes maximum, each of the distances between the neighboring distribution optical waveguides is an integer multiple of the pitch.

A method for manufacturing an optical waveguide device according an exemplary aspect of the invention includes:

forming a first branching device on an optical waveguide substrate that comprises a latticed dummy pattern having a predetermined pitch, the first branching device branching input first light into two light beams, first and second distribution optical waveguides being connected to the first branching device, the first distribution optical waveguide outputting as second light one of the two light beams, the second distribution optical waveguide outputting as third light the other of the two light beams;

forming a second branching device on the optical waveguide substrate, the second branching device branching input fourth light into two light beams, third and fourth distribution optical waveguides being connected to the second branching device, the third distribution optical waveguide outputting as fifth light one of the two light beams of the fourth light, the fourth distribution optical waveguide outputting as sixth light the other of the two light beams of the fourth light;

forming a first interfering device on the optical waveguide substrate, the first interfering device making the second light interfere with the fifth light to thereby generate and output light, the first distribution optical waveguide and the third distribution optical waveguide being connected to the first interfering device;

forming a second interfering device on the optical waveguide substrate, the second interfering device making the third light interfere with the sixth light to thereby generate and output light, the second distribution optical waveguide and the fourth distribution optical waveguide being connected to the second interfering device;

forming the second distribution optical waveguide and the third distribution optical waveguide in such a manner that the second and third distribution optical waveguides intersect with each other at an intersection portion;

arranging the first and second branching devices, the first to fourth distribution optical waveguides, the first and second interfering devices, and the intersection portion, in a region where the dummy pattern is removed, in such a manner that each part is separated from the dummy pattern;

setting an interval between the first distribution optical waveguide and the second distribution optical waveguide at an output point of the first branching device and an interval between the third and fourth distribution optical waveguides at an output point of the second branching device to an equal value; setting a distance between a light propagation center of the first branching device and a light propagation center of the second branching device to an integer multiple of the pitch; and at a point where a distance between neighboring distribution optical waveguides of the first to fourth distribution optical waveguides becomes maximum, setting the distance between the neighboring distribution optical waveguides to an integer multiple of the pitch.

An optical waveguide device according to an exemplary aspect of the invention includes:

a latticed dummy pattern having a predetermined pitch; and a first optical waveguide and a second optical waveguide that are arranged, in a region where the dummy pattern has been removed, so as to be separated from the dummy pattern;

wherein arrangement of the dummy pattern around the first optical waveguide matches arrangement of the dummy pattern around the second optical waveguide.

An optical waveguide device and a method for manufacturing the same according to the present invention enable manufacturing of an optical waveguide device superior in reproducibility and mass productivity.

BRIEF DESCRIPTION OF THE DRAWINGS

Exemplary features and advantages of the present invention will become apparent from the following detailed description when taken with the accompanying drawings in which.

EXEMPLARY EMBODIMENT

In the following, exemplary embodiments of the present invention are described with reference to the drawings. First, a dummy pattern common to the following exemplary embodiments is described. The dummy pattern is provided on a wafer to reduce manufacturing variation among optical waveguide devices. The dummy pattern is not used for transmission of light. The dummy pattern is arranged on a photomask layer shared with optical waveguides, and is formed on the wafer at the same time that the optical waveguides are formed. The dummy pattern near the optical waveguides is removed in accordance with a prescribed condition at the time of designing the photomask. For example, the dummy pattern satisfying the predetermined condition concerning a distance, a size, and a shape in relation to the optical waveguides is removed. The optical waveguides are arranged, in a region where the dummy pattern is removed, so as to be separated from the dummy pattern by a predetermined interval.

Figure 5:
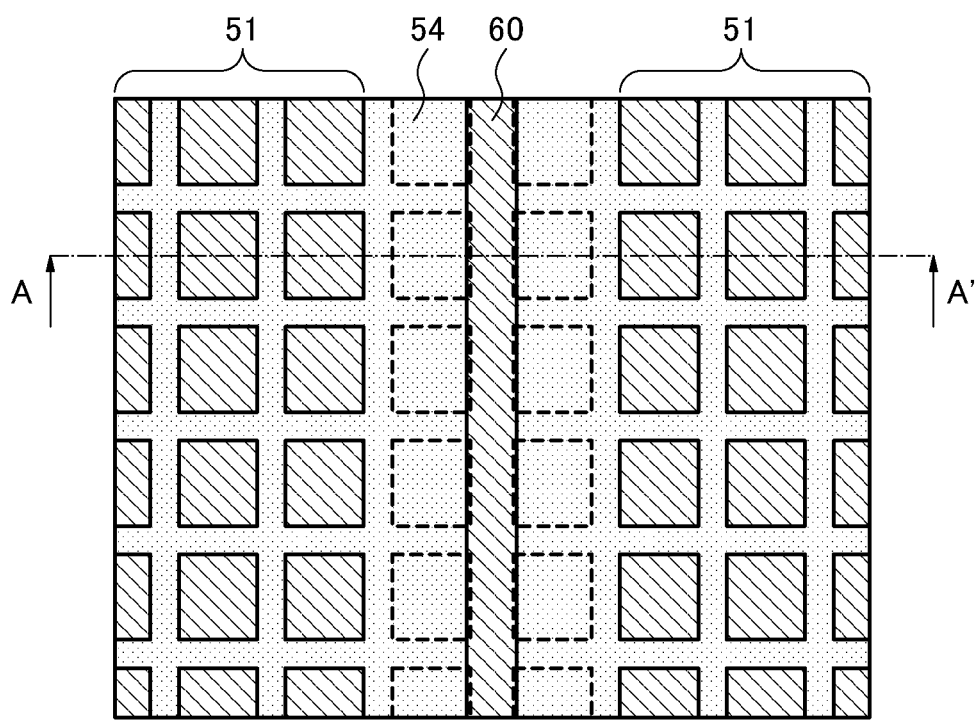
FIG. 5 is a plan view illustrating an example configuration of a dummy pattern.
Figure 6:
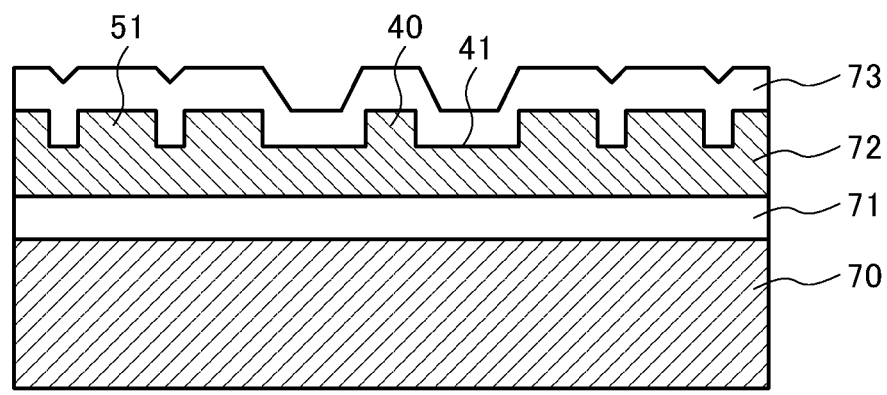
FIG. 6 is a sectional view illustrating the example configuration of the dummy pattern.

FIG. 5 and FIG. 6 are a plan view and a sectional view illustrating an example configuration of the dummy pattern. FIG. 5 is the plan view of an optical waveguide wafer, and FIG. 6 is the sectional view taken along the cut line A-A' of FIG. 5. In the following, as an example, manufacturing of a silicon optical waveguide is described.

In FIG. 5 and FIG. 6, a silicon oxide layer upper layer 73 is stacked on a silicon-on-insulator (SOI) substrate structured by a silicon substrate 70, a silicon oxide layer lower layer 71, and a silicon layer 72. Formed in the silicon layer 72 are both a core pattern 40 of a silicon optical waveguide 60 and a dummy structure 51 formed by a latticed dummy pattern.

The silicon optical waveguide 60 is what is called a ridge-type optical waveguide. A propagation layer of the silicon optical waveguide 60 is formed by a plate-like slab 41 of which silicon film is thin, and by a narrow core 40 of which silicon film is thick. In the sectional shape of the core 40 and the slab 41 illustrated in FIG. 6, the convex shape of the ridge-type optical waveguide appears.

The core 40 is arranged at a predetermined position in the wafer surface by optical circuit designing. In the dummy structure 51, the dummy pattern in a region overlapping the core 40 of the silicon optical waveguide 60 and the dummy pattern near the core 40 are removed at the time of designing the optical waveguide. The removed dummy patterns are illustrated as removed marks 54 indicated by the broken lines in FIG. 5.

Before arrangement of the optical waveguide is designed, the dummy structure 51 exists on the entire surface of the wafer with the dummy pattern arranged as a periodic lattice structure at a predetermined pitch. By the dummy structure 51, the pattern density in the wafer surface can be kept substantially constant so that an average etching rate of the entire wafer can be kept constant. As a result, a more uniform optical waveguide device can be manufactured.

First Exemplary Embodiment

Figure 1:
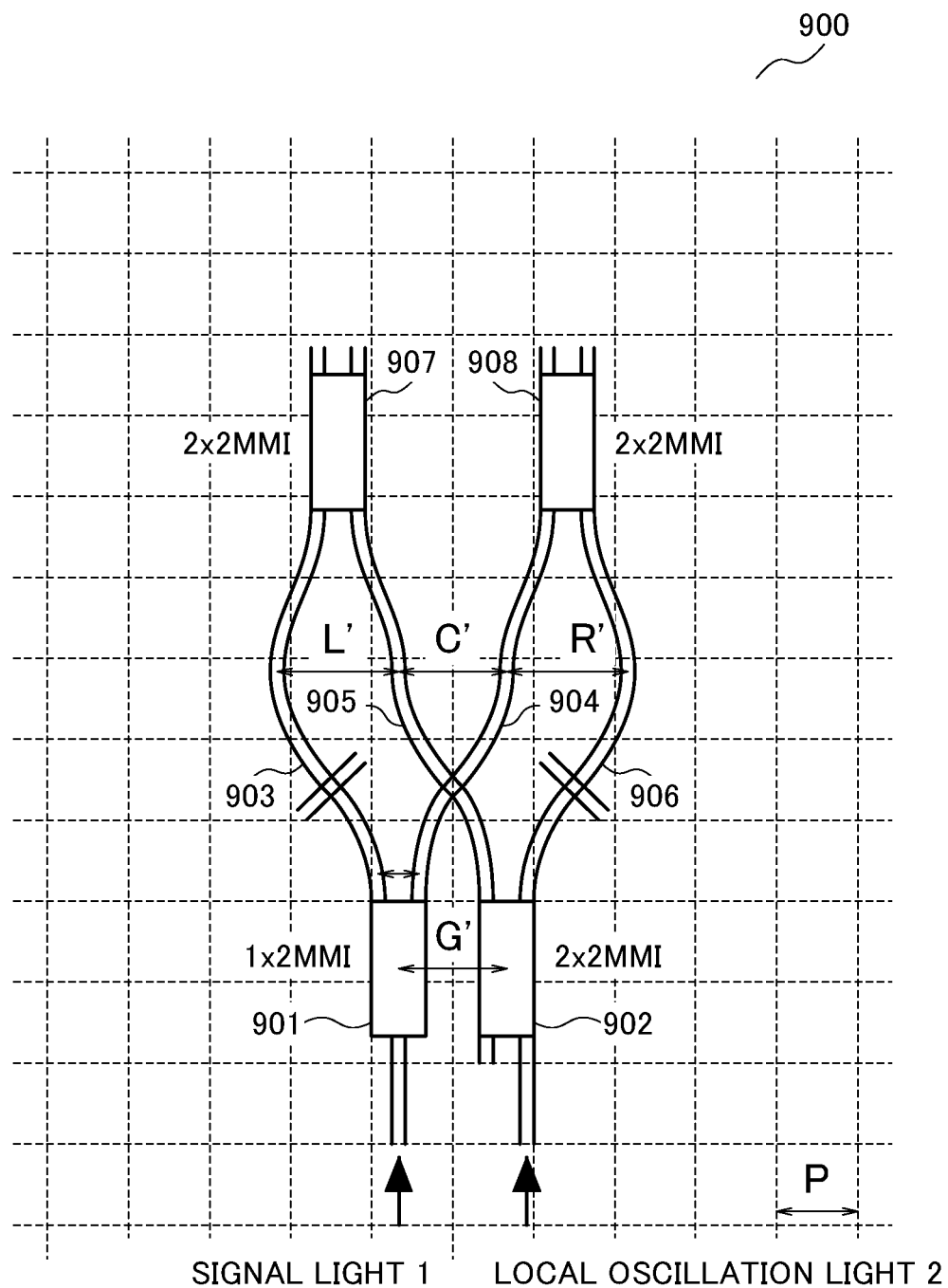
FIG. 1 illustrates a configuration of a hybrid mixer according to a first exemplary embodiment.

FIG. 1 illustrates a configuration of a hybrid mixer 900 according to a first exemplary embodiment of the present invention. In the hybrid mixer 900, signal light 1 is branched into two signal light beams by a 1×2 multi-mode interferometer (MMI) 901. Local oscillation light (LO) 2 is branched into two light beams by a 2×2 MMI 902. A 2×2 MMI 907 causes the signal light portion propagated through a distribution optical waveguide 903 to interfere with the light portion LO propagated through a distribution optical waveguide 905. A 2×2 MMI 908 causes the signal light portion propagated through a distribution optical waveguide 904 to interfere with the light portion LO propagated through a distribution optical waveguide 906. The wafer in which the hybrid mixer 900 is formed includes a latticed dummy pattern having a pitch P. The lattice broken lines in FIG. 1 indicate the center lines of the dummy pattern. As described above, the dummy pattern near the optical waveguides structuring the hybrid mixer 900 is practically removed so that the hybrid mixer 900 is arranged to be separated from the dummy pattern. In FIG. 1 to FIG. 4, for the purpose of making the drawings easily viewable, only the center lines of the dummy pattern are depicted by the lattice broken lines, and the dummy pattern itself is not illustrated.

The hybrid mixer 900 of the first exemplary embodiment is formed on the wafer including the dummy structure 51. By the dummy structure 51, the pattern density in the wafer surface can be kept almost constant. For this reason, the hybrid mixer 900 of the first exemplary embodiment can achieve an advantageous effect that a hybrid mixer superior in reproducibility and mass productivity can be actually made.

Second Exemplary Embodiment

The hybrid mixer 900 described in the first exemplary embodiment can be designed such that the geometric lengths of the distribution optical waveguides 903 to 906 become minimum. The intervals between the distribution optical waveguides 903 to 906 depend on the distance between the waveguides on the output side of the branching devices (the 1×2 MMI 901 and the 2×2 MMI 902). For this reason, the intervals between the distribution optical waveguides 903 to 906 are not necessarily an integer multiple of the pitch P of the dummy pattern. In other words, on the assumption that the intervals between the distribution optical waveguides 903 to 906 illustrated in FIG. 1 are L' (left), C' (center), and R' (right), the relation of L'=R'≠C'≠n×P (where n is a positive integer) generally holds. For this reason, the identity of the dummy pattern (the surrounding dummy pattern) around the distribution optical waveguides 903 to 906 is not secured. The wording "the identity of the surrounding dummy pattern is secured" means that difference in influence on the shapes of respective optical waveguides in the process of manufacturing the optical waveguides becomes sufficiently small in terms of the properties of the optical waveguides, with the difference being caused by the state of the arrangement (the pattern density distribution) of the dummy pattern around the optical waveguides.

When designing is made such that the length of each distribution optical waveguide of a hybrid mixer becomes minimum as in the hybrid mixer 900 of the first exemplary embodiment, arrangement of the dummy pattern around each distribution optical waveguide may differ from optical waveguide to optical waveguide. When arrangement of the dummy pattern around each distribution optical waveguide differs from optical waveguide to optical waveguide, variation in a local etching state can occur at the time of manufacturing the distribution optical waveguides. As a result, variation in the properties of the four distribution optical waveguides occurs as well, and the identity of the surrounding dummy pattern may not be secured.

Configuration of Second Exemplary Embodiment

Figure 2:
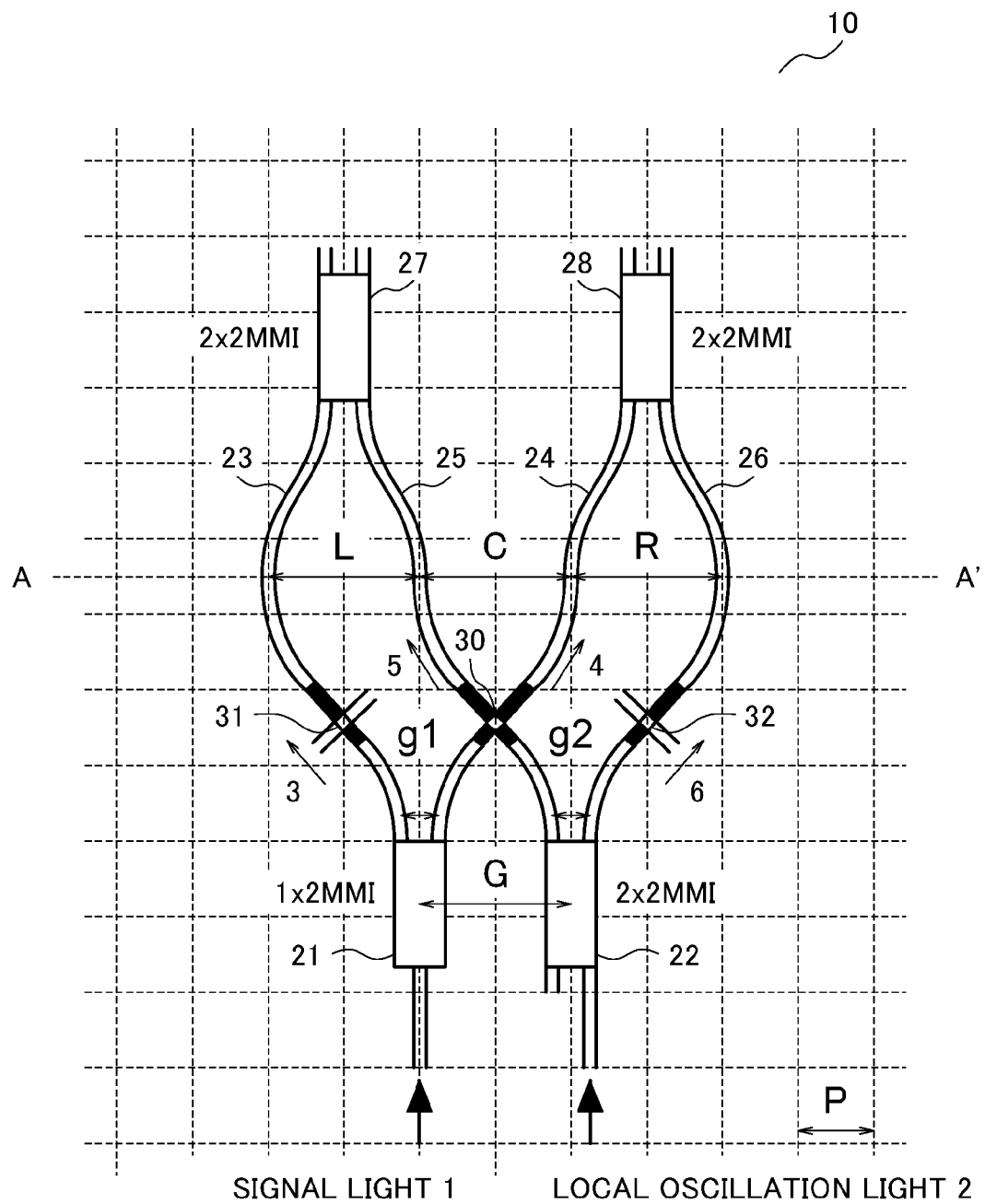
FIG. 2 illustrates a configuration of a hybrid mixer according to a second exemplary embodiment.

FIG. 2 illustrates a configuration of a hybrid mixer 10 according to a second exemplary embodiment of the present invention. The hybrid mixer 10 includes silicon optical waveguides. Signal light 1 and local oscillation light (LO) 2 are branched by a 1×2 MMI 21 and a 2×2 MMI 22, respectively. The 1×2 MMI 21 branches the input signal light 1 by a branching ratio of 1:1. The 2×2 MMI 22 branches the input LO 2 by a branching ratio of 1:1. The branched signal light beams 3 and 4, and the branched light beams LO5 and LO6 are propagated through distribution optical waveguides 23, 24, 25, and 26, respectively, and are input to 2×2 MMIs 27 and 28 as interfering devices. The 2×2 MMI 27 causes the signal light portion 3 and the light portion LO5 to interfere with each other. The 2×2 MMI 28 causes the signal light portion 4 and the light portion LO6 to interfere with each other. During the distribution, the distribution optical waveguide 24 and the distribution optical waveguide 25 intersect with each other at an intersection portion 30. The lattice broken lines in FIG. 2 indicate the center lines of the dummy pattern.

The hybrid mixer 10 includes straight optical waveguides in front of and behind the intersection portion 30. The straight optical waveguides are used to align the distribution optical waveguides 24 and 25 with the dummy pattern. In FIG. 2, the straight optical waveguides are filled in with black.

The distribution optical waveguides 23 and 26 do not necessarily need to include intersection portions. Meanwhile, in order that loss properties and phase properties of the distribution optical waveguides 23 to 26 conform to each other, the geometric lengths and configurations of the distribution optical waveguides 23 to 26 are desirably the same as much as possible. For this reason, in the hybrid mixer 10 illustrated in FIG. 2, the distribution optical waveguides 23 and 26 are provided with intersection portions 31 and 32, respectively.

Description of Operation

Detailed operation of the hybrid mixer 10 is described. By the 1×2 MMI 21, the signal light 1 is branched into two signal light beams having the same intensity. By the 2×2 MMI 22, the LO 2 is branched into two light beams having the same intensity. Phase difference between the signal light beams 3 and 4 output from the 1×2 MMI 21 is zero (same phase), and phase difference between the light beams LO 5 and LO 6 output from the 2×2 MMI 22 is 90 degrees. Since the phase difference between the light portions output from the 2×2 MMI 22 becomes 90 degrees in a wide wavelength range, the hybrid mixer superior in a wavelength characteristics can be actually made by giving the phase difference between the LO 5 and the LO 6 by using the 2×2 MMI 22.

Thus, in the hybrid mixer 10, at the time that the signal light 1 and the LO 2 are branched by the 1×2 MMI 21 and the 2×2 MMI 22, desired phase difference is given to the branched light beams. Accordingly, it is sufficient that in the 2×2 MMIs 27 and 28 as interfering devices, the signal light portion LO 3 and the light portion LO 5, and, the signal light portion 4 and the light portion LO6 are made to interfere with each other while the phase difference between the signal light beams 3 and 4 in the output of the 1×2 MMI 21, and the phase difference between the light beams LO 5 and LO 6 in the output of the 2×2 MMI 22 are maintained.

In order that the branched signal light beams and the branched light beams LO are made to interfere with each other by the 2×2 MMIs 27 and 28, the intersection portion 30 is provided in the distribution optical waveguides, as described above. Considering restrictions on a desired intersecting angle at the intersection portion 30 and the radii of curvature of designed circular arcs of the optical waveguides, the shortest distance between light propagation centers of the 1×2 MMI 21 and the 2×2 MMI 22 can be determined.

The hybrid mixer 10 is designed so as to satisfy a "first condition" that distances g1 and g2 in FIG. 2 are equal to each other. The first condition is set for securing the identity of the surrounding dummy pattern around the distribution optical waveguides 23 to 26. The reference symbol g1 designates the distance between the distribution optical waveguide 23 and the distribution optical waveguide 24 at the output point of the 1×2 MMI 21. The reference symbol g2 designates the distance between the distribution optical waveguide 25 and the distribution optical waveguide 26 at the output point of the 2×2 MMI 22. In the following, the distances between the distribution optical waveguides at the output points of the 1×2 MMI 21 and the 2×2 MMI 22 are referred to as "output optical waveguide intervals". In other words, the first condition can be written as "on the output optical waveguide intervals, g1=g2".

Further, the hybrid mixer 10 is designed in line with the following "second condition" to secure the identity of the surrounding dummy pattern around the distribution optical waveguides 23 to 26. According to the second condition, the hybrid mixer 10 is designed such that a distance G between light propagation centers of the 1×2 MMI 21 and the 2×2 MMI 22 is longer than the shortest distance that can be designed, and the distance G is an integer multiple of the pitch P of the dummy pattern. The distance G between the light propagation centers is the interval between light-propagation-direction center lines of the 1×2 MMI 21 and the 2×2 MMI 22. In other words, the second condition can be written as "the distance G between the light propagation centers is G=m×P where m is a positive integer".

To design the hybrid mixer 10 satisfying the first and second conditions, optical waveguides may be added in front of and behind the intersection portions 30 to 32. In FIG. 2, the added optical waveguides are illustrated as straight optical waveguides which are filled in with black. Alternatively, to satisfy the first and second conditions, the radii of curvature of circular arcs of the distribution optical waveguides 23 to 26 connected to the intersection portions 30 to 32 may be adjusted.

Specific design values are described in the following. For example, the pitch P of the dummy pattern is 100 μm, the allowable minimum designed radius of curvature is 150 μm, the intersecting angle of the intersection portion 30 is 90 degrees, and the output optical waveguide intervals g1 and g2 of the 1×2 MMI 21 and the 2×2 MMI 22 are each 10 μm. In this case, the shortest distance between the center of the 1×2 MMI 21 and the center of the 2×2 MMI 22 becomes 160 μm. Since the pitch P is 100 μm, a distance that is an integer multiple of the pitch P and that is no shorter than and the closest to 160 μm is 200 μm. Accordingly, the distance G between the light propagation centers of the 1×2 MMI 21 and the 2×2 MMI 22 is 200 μm.

In FIG. 2, each of the distribution optical waveguides 23 to 26 leading from the 1×2 MMI 21 and the 2×2 MMI 22 to the intersection portions 30 to 32 is a circular-arc optical waveguide having a curvature radius of 150 μm, except for the straight optical waveguides and the intersection portions 30 to 32. The distribution optical waveguides 24 and 25 branch from the respective MMIs so as to make an intersecting angle of 90 degrees at the intersecting portion 30.

Figure 3:
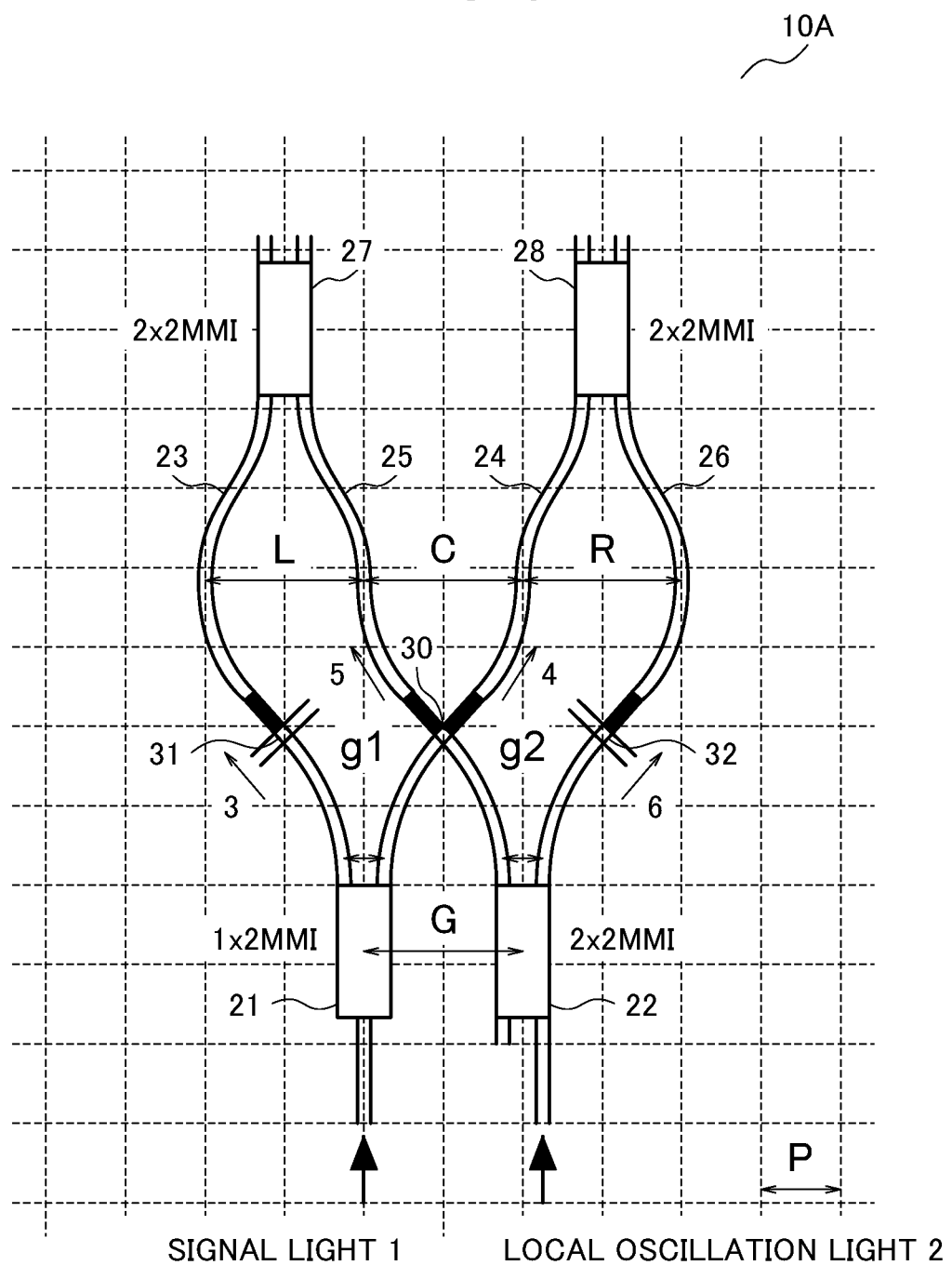
FIG. 3 illustrates another design example of the hybrid mixer.

FIG. 3 illustrates a configuration of a hybrid mixer 10A according to another design example. FIG. 3 illustrates an example designed such that the distribution optical waveguides 24 and 25 intersect with each other at an angle of 90 degrees, in which the radii of curvature of circular arcs of the distribution optical waveguides 23 to 26 in a range from the 1×2 MMI 21 and the 2×2 MMI 22 to the intersection portions 30 to 32 are 210 μm. In the example of FIG. 3, straight optical waveguides are not provided on the input side from the intersection portions 30 to 32 (i.e., on the sides closer to the 1×2 MMI 21 and the 2×2 MMI 22).

The shapes of the distribution optical waveguides 23 to 26 are not limited to circular arcs, and curved lines of various shapes such as those expressed by a Raised sine function can be used to adjust the arrangement of the optical waveguides. For example, when it is intended to reduce loss in the optical waveguides by providing tapered waveguides in the intersection portions 30 to 32, the configurations of the optical waveguides may be determined in accordance with the shapes of the tapered waveguides.

Next, description is further made about a "third condition" for securing the identity of the surrounding dummy pattern around the distribution optical waveguides 23 to 26 in a region on the output side from the intersection portions 30 to 32 (i.e., on the side closer to the 2×2 MMIs 27 and 28). According to the third condition, the intervals between the distribution optical waveguides 23 to 26 are adjusted such that at the points where the distances between the neighboring distribution optical waveguides 23 to 26 become maximum, these distances each become an integer multiple of the pitch P. In the hybrid mixer 10 illustrated in FIG. 2, the points where the distances between the neighboring distribution optical waveguides 23 to 26 become maximum are positioned on the broken line A-A'.

To satisfy the third condition, the optical waveguides are designed such that the intervals L, C, and R between the distribution optical waveguides 23 to 26 become larger than minimum intervals therebetween, and each become an integer multiple of the pitch P. In FIG. 2 and FIG. 3, the straight optical waveguides which are filled in with black and illustrated in front of and behind, or behind the intersection portions 30 to 32 to be illustrated are added to further satisfy the third condition.

The third condition can be written as "L=C=R=n×P (where n is a positive integer)", for example. By the third condition, the identity of the surrounding dummy pattern can be secured while phase relation between the respective distribution optical waveguides is not changed.

Figure 4:
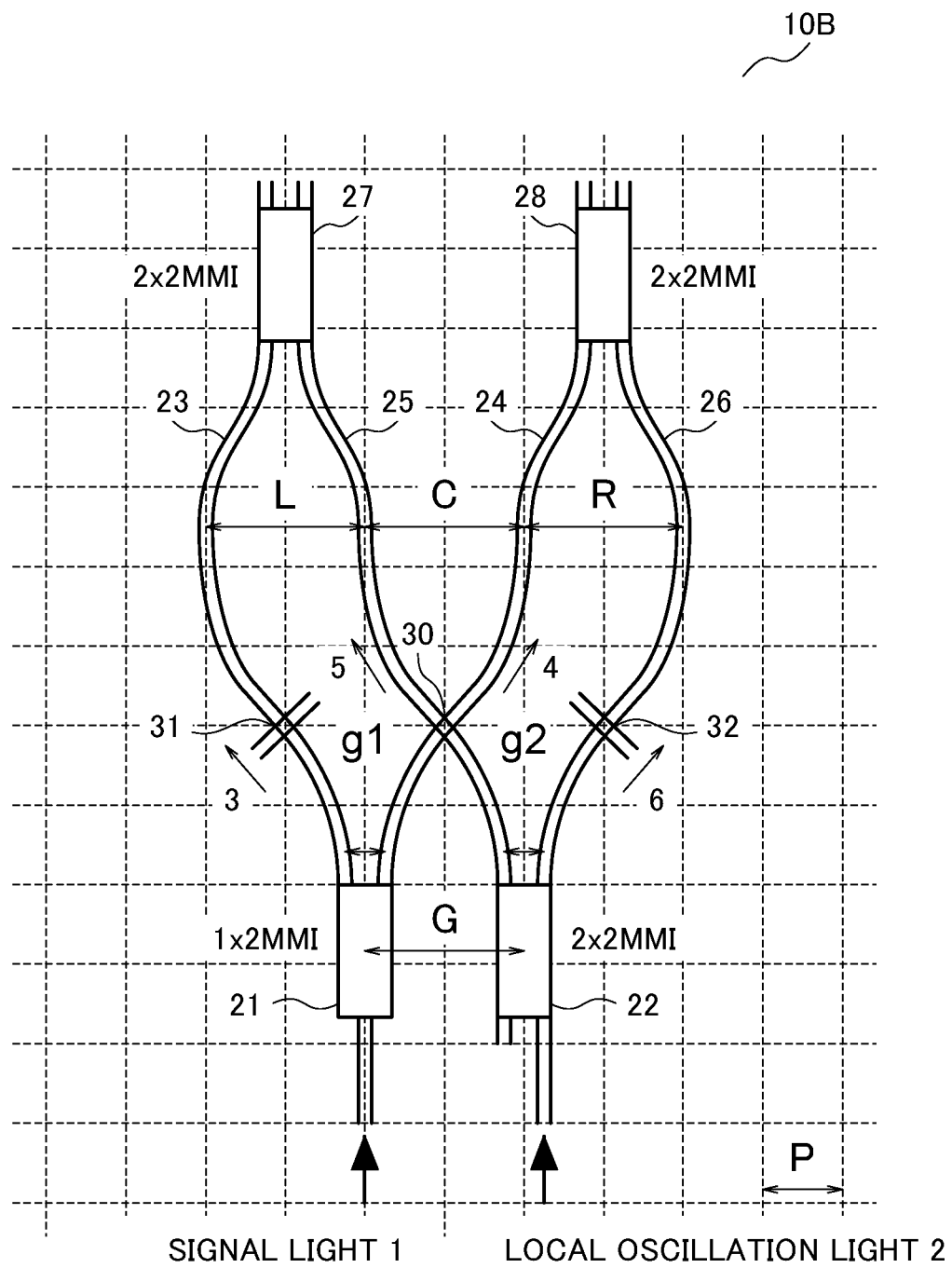
FIG. 4 illustrates still another design example of the hybrid mixer.

FIG. 4 illustrates a configuration of a hybrid mixer 10B according to still another design example. In the configuration illustrated in FIG. 4, intervals between the distribution optical waveguides 23 to 26 are adjusted by changing the circular-arc curvature radii of the distribution optical waveguides 23 to 26 without adding straight optical waveguides. Thus, to satisfy the first to third conditions, straight optical waveguides do not necessarily need to be used. As illustrated in FIG. 4, the circular-arc curvature radii of the distribution optical waveguides 23 to 26 may be changed to adjust the intervals between the distribution optical waveguides 23 to 26 by using the configuration other than straight optical waveguides.

By designing the optical waveguides of the hybrid mixer so as to satisfy the above-described first to third conditions, the identity of the surrounding dummy pattern around all the distribution optical waveguides can be secured. As a result, manufacturing variation among the optical waveguides and influence of the pattern effect can be minimized, and the hybrid mixer superior in reproducibility and mass productivity can be actually manufactured. Further, by the first to third conditions, symmetry of the configuration of the entire hybrid mixer can be improved so that improvement in mass productivity and reduction in characteristics variation among the optical waveguides can be expected as well.

In designing of an optical waveguide substrate including the dummy pattern, it was difficult for a designer to take into account influence of the dummy pattern around optical waveguides in advance. The reason is that because of process control, usually, the surrounding dummy pattern was automatically arranged after designing of an optical circuit. In spite of that, designing the optical waveguides so as to satisfy the first to third conditions enables designing of the hybrid mixer in which influence of the surrounding dummy pattern is reduced.

In the second exemplary embodiment, there are an indefinite number of combinations of two design values for the length of the straight optical waveguides and the curvature radius of the distribution optical waveguides 23 to 26 on the output side of the intersection portions 30 to 32. The curvature radius of the distribution optical waveguides 23 to 26 does not need to be constant. In the second exemplary embodiment, any arrangement of the distribution optical waveguides 23 to 26 that satisfies the first to third conditions may be adopted.

Conditions for securing the identity of the surrounding dummy pattern are not limited to the above-described first to third conditions. For example, even in the case of L=R=p×P and C=q×P (where p and q are different positive integers), the identity of the surrounding dummy pattern can be secured. In addition, in the first to third conditions, the respective numerical values do not need to be strictly the same as each other as long as desired optical characteristics can be obtained.

Further, in the second exemplary embodiment, at the position (on the line A-A' in FIG. 2) where the intervals between the distribution optical waveguides 23 to 26 become maximum, the distribution optical waveguides 23 to 26 are positioned on the center lines of the dummy pattern that are parallel with the light propagation direction. In this regard, the dummy pattern is practically deleted at the time of designing. In FIG. 2 to FIG. 4, the hybrid mixers 10, 10A, and 10B may be arranged so as to be shifted by half of the pitch from the dummy structure in the left or right direction in the respective drawings. When the area of the removed dummy pattern is decreased as a result of the shifting by half of the pitch, such arrangement is also effective. The decrease in the area of the removed dummy pattern can reduce influence given on the pattern density distribution of the entire wafer with the optical waveguides structuring the hybrid mixer.

Third Exemplary Embodiment

An optical waveguide device of a third exemplary embodiment includes a latticed dummy pattern having a predetermined pitch, and a first optical waveguide and a second optical waveguide that are arranged, in a region where the dummy pattern has been removed, so as to be separated from the dummy pattern. The first optical waveguide and the second optical waveguide correspond to any two of the distribution optical waveguides 23 to 26 in FIG. 2 to FIG. 4, for example. The first optical waveguide and the second optical waveguide are designed such that arrangement of the surrounding dummy pattern becomes the same. In other words, designing is made such that arrangement of the dummy pattern around the first optical waveguide matches arrangement of the dummy pattern around the second optical waveguide. Adopting such a configuration can reduce variation in optical waveguide manufacturing size caused by the arrangement of the dummy pattern around the optical waveguides, and consequently can reduce variation in the characteristics of the optical waveguide device. In other words, the optical waveguide device of the third exemplary embodiment can also achieve the advantageous effect that an optical waveguide device superior in reproducibility and mass productivity can be manufactured.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

For example, the first and second exemplary embodiments are described above by citing the hybrid mixers as examples. The first to third conditions, however, may be applied to designing of other optical waveguide devices so that optical waveguide devices superior in reproducibility and mass productivity can be actually made.

The invention claimed is:

1. An optical waveguide device comprising:
    a hybrid mixer having a first branching device branching input first light into two light beams and a second branching device branching input fourth light into two light beams; and
    a plurality of dummy patterns being arranged as a periodic lattice at a layer where the hybrid mixer is arranged, the dummy pattern having predetermined pitch;
    wherein the plurality of dummy patterns are arranged around the hybrid mixer; and
    a distance between a light propagation center of the first branching device and a light propagation center of the second branching device is an integer multiple of the pitch of the dummy pattern.

2. The optical waveguide device according to claim 1, the hybrid mixer further comprising:
    first and second distribution optical waveguides being connected to the first branching device, the first distribution optical waveguide outputting as second light one of the two light beams, the second distribution optical waveguide outputting as third light the other of the two light beams;
    third and fourth distribution optical waveguides being connected to the second branching device, the third distribution optical waveguide outputting as fifth light one of the two light beams of the fourth light, the fourth distribution optical waveguide;
    wherein the second distribution optical waveguide intersects with the third distribution optical waveguide at an intersection portion.

3. The optical waveguide device according to claim 2, at a point where a distance between neighboring distribution optical waveguides of the first to fourth distribution optical waveguides becomes maximum, each of the distances between the neighboring distribution optical waveguides is an integer multiple of the pitch of the dummy pattern.

4. The optical waveguide device according to claim 3, wherein at the point where the distance between the neighboring distribution optical waveguides becomes maximum, all distances between the neighboring distribution optical waveguides are equal to each other.

5. The optical waveguide device according to claim 3 wherein the first to fourth distribution optical waveguides are arranged such that points where respective distances between the neighboring distribution optical waveguides become maximum are positioned on center lines that are among center lines of the dummy pattern and that are parallel with light propagation directions of the first to fourth distribution optical waveguides.

6. The optical waveguide device according to claim 3, wherein straight optical waveguides are additionally provided in the first to fourth distribution optical waveguides.

7. The optical waveguide device according to claim 3, wherein the first to fourth distribution optical waveguides are arranged such that points where respective distances between the neighboring distribution optical waveguides become maximum are separated by half of the pitch in directions perpendicular to light propagation directions of the first to fourth distribution
 optical waveguides from center lines that are among center lines of the dummy pattern and that are parallel with the light propagation directions.

8. The optical waveguide device according to claim 3, wherein the optical waveguide device is structured by silicon waveguides formed on a silicon substrate.

\* \* \* \* \*

UNITED STATES PATENT AND TRADEMARK OFFICE
CERTIFICATE OF CORRECTION

PATENT NO. : 10,422,952 B2
APPLICATION NO. : 15/865897
DATED : September 24, 2019
INVENTOR(S) : Morio Takahashi Page 1 of 1

It is certified that error appears in the above-identified patent and that said Letters Patent is hereby corrected as shown below:

In the Specification

Column 5, Exemplary Embodiment, Line 53; Delete "$L'=R \neq C \neq n \times P$" and insert -- $L'=R' \neq C' \neq n \times P$ -- therefor Signed and Sealed this
Fourteenth Day of January, 2020

Andrei Iancu
*Director of the United States Patent and Trademark Office*